(12) United States Patent
Tanaka

(10) Patent No.: US 10,606,143 B2
(45) Date of Patent: Mar. 31, 2020

(54) MULTIMODE INTERFEROMETER, MACH-ZEHNDER MODULATION DEVICE

(71) Applicant: SUMITOMO ELECTRIC INDUSTRIES, LTD., Osaka (JP)

(72) Inventor: Hajime Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/017,359

(22) Filed: Jun. 25, 2018

(65) Prior Publication Data

US 2018/0373114 A1    Dec. 27, 2018

(30) Foreign Application Priority Data

Jun. 27, 2017  (JP) .................. 2017-125538
Apr. 23, 2018  (JP) .................. 2018-082503

(51) Int. Cl.
| | | |
|---|---|---|
| *G02F 1/225* | (2006.01) | |
| *G02B 6/28* | (2006.01) | |
| *G02B 6/293* | (2006.01) | |
| *G02B 6/12* | (2006.01) | |
| *G02F 1/21* | (2006.01) | |

(52) U.S. Cl.
CPC ............ *G02F 1/225* (2013.01); *G02B 6/12* (2013.01); *G02B 6/2813* (2013.01); *G02B 6/29344* (2013.01); *G02F 2001/212* (2013.01); *G02F 2001/217* (2013.01); *G02F 2203/50* (2013.01)

(58) Field of Classification Search
CPC ............. G02F 1/225; G02F 2001/212; G02F 2203/50; G02F 1/21; G02F 1/0054; G02F 2001/217; G02B 6/125; G02B 6/1228; G02B 6/136; G02B 6/305; G02B 6/2935; G02B 2006/1215; G02B 206/12159; G02B 2006/12097; G02B 2006/1209; G02B 6/12; G02B 6/2813; G02B 6/29344
USPC ........................................ 385/1–3, 14, 28, 42
See application file for complete search history.

(56) References Cited

U.S. PATENT DOCUMENTS 5,563,968 A * 10/1996 Pennings ............. G02B 6/2813
                                                                372/108
6,236,784 B1 * 5/2001 Ido ....................... G02B 6/125
                                                                385/39

(Continued)

FOREIGN PATENT DOCUMENTS

JP       2006-323136       11/2006
JP       2007-233294       9/2007

*Primary Examiner* — Robert Tavlykaev
(74) *Attorney, Agent, or Firm* — Smith, Gambrell & Russell, LLP.

(57) ABSTRACT

A multimode interferometer includes: a multimode waveguide mesa having a top face extending in a direction of a first axis, a first side face and a second side face that extend in the direction of the first axis, and a first end face and a second end face that are arranged in the direction of the first axis; and a waveguide mesa connected to the first end face at a port; first and second waveguide mesas connected to first and second ports on the second end face. The multimode waveguide mesa has a first side edge line shared by the top face and the first side face, and an end line shared by the top face and the first end face. The first side edge line forms an acute angle with the end line at an outer vertex where the first side edge line and the end line meet.

13 Claims, 9 Drawing Sheets

(56) References Cited

U.S. PATENT DOCUMENTS

| | | | | |
|---|---|---|---|---|
| 7,058,259 B2* | 6/2006 | Stuart | G02B 6/122 | 385/28 |
| 7,088,889 B2* | 8/2006 | Takahashi | G02B 6/1228 | 385/27 |
| 7,280,713 B2* | 10/2007 | Doi | G02B 6/2813 | 385/11 |
| 7,343,070 B2* | 3/2008 | Van Der Vliet | G02B 6/1228 | 385/28 |
| 7,539,378 B2* | 5/2009 | Takabayashi | B82Y 20/00 | 385/39 |
| 8,483,525 B2* | 7/2013 | Kitoh | G02B 6/12019 | 385/14 |
| 8,526,478 B2* | 9/2013 | Ishimura | B82Y 20/00 | 372/50.1 |
| 8,532,447 B1* | 9/2013 | Kwakernaak | G02B 6/2813 | 385/31 |
| 9,081,253 B2* | 7/2015 | Kono | G02F 1/225 | |
| 10,359,569 B2* | 7/2019 | Dumais | G02B 6/1228 | |
| 2002/0154849 A1* | 10/2002 | Leuthold | G02B 6/12007 | 385/15 |
| 2003/0152324 A1* | 8/2003 | Betty | G02B 6/12004 | 385/29 |
| 2004/0008944 A1* | 1/2004 | Johannessen | G02B 6/125 | 385/45 |
| 2009/0052834 A1* | 2/2009 | Tanaka | G02B 6/125 | 385/14 |
| 2011/0235961 A1* | 9/2011 | Hashimoto | G02F 1/2257 | 385/3 |
| 2011/0305255 A1* | 12/2011 | Ishimura | B82Y 20/00 | 372/50.1 |
| 2013/0064492 A1* | 3/2013 | Ishikawa | G02B 6/12007 | 385/2 |
| 2014/0133794 A1* | 5/2014 | Kono | G02F 1/225 | 385/3 |
| 2014/0185978 A1* | 7/2014 | Liao | G02F 1/00 | 385/3 |
| 2015/0185582 A1* | 7/2015 | Kwakernaak | G02F 1/2257 | 438/69 |
| 2016/0011370 A1* | 1/2016 | Okayama | G02B 6/125 | 385/14 |
| 2016/0025922 A1* | 1/2016 | Kono | G02F 1/025 | 385/2 |
| 2016/0178846 A1* | 6/2016 | Summers | G02B 6/29344 | 385/14 |
| 2017/0131471 A1* | 5/2017 | Ishikura | G02B 6/1228 | |

* cited by examiner

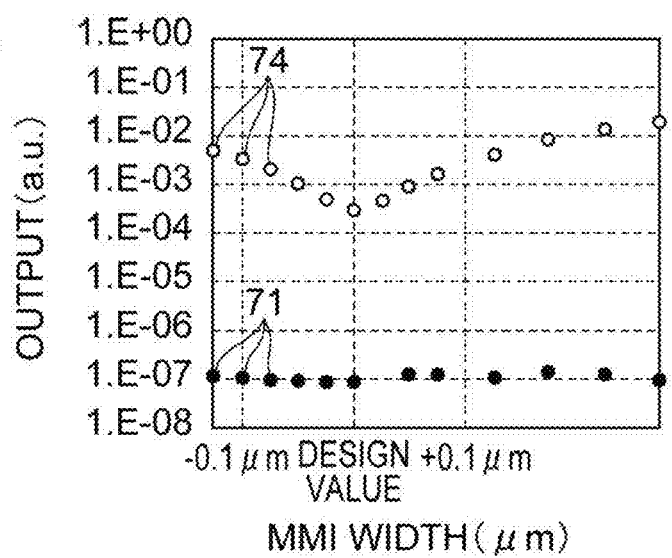

MULTIMODE INTERFEROMETER, MACH-ZEHNDER MODULATION DEVICE

BACKGROUND OF THE INVENTION

Field of the Invention

The present invention relates to a multimode interferometer and a Mach-Zehnder modulation device. This application claims the benefit of priorities from Japanese Patent Application No. 2018-082503 filed on Apr. 23, 2018, and Japanese Patent Application No. 2017-125538 filed on Jun. 27, 2017, which are herein incorporated by reference in their entirety.

Related Background Art

Japanese Patent Application Laid-Open No. 2007-233294, which is referred to as Patent Document 1, discloses an optical coupler. Japanese Patent Application Laid-Open No. 2006-323136 (Japanese Patent No. 4499611, which is referred as Patent Document 2) discloses a multimode interference type optical waveguide.

SUMMARY OF THE INVENTION

A Mach-Zehnder modulator according to one aspect of the present invention includes: a first arm waveguide mesa; a second arm waveguide mesa; a waveguide mesa; and a merger optically coupled to the first arm waveguide mesa, the second arm waveguide mesa, and the waveguide mesa. The merger includes a multimode waveguide mesa. The multimode waveguide mesa has a top face extending in a direction of a first axis, a first side face and a second side face that extend in the direction of the first axis, and a first end face and a second end face that are arranged in the direction of the first axis. The multimode waveguide mesa is connected to the waveguide mesa at a port on the first end face. The multimode waveguide mesa is connected to the first arm waveguide mesa at a first port on the second end face. The multimode waveguide mesa is connected to the second arm waveguide mesa at a second port on the second end face. The multimode waveguide mesa has a first side edge line shared by the first side face and the top face of the multimode waveguide mesa, and a front edge line shared by the first end face and the top face of the multimode waveguide. The first side edge line and the front edge line meet at an outer vertex, and the first side edge line forms an acute angle with the front edge line at the outer vertex.

A Mach-Zehnder modulator according to one aspect of the present invention includes: a first arm waveguide mesa; a second arm waveguide mesa; a waveguide mesa; and a divider optically coupled to the first arm waveguide mesa, the second arm waveguide mesa, and the waveguide mesa. The divider includes a multimode waveguide mesa. The multimode waveguide mesa has a top face extending in a direction of a first axis, a first side face and a second side face that extend in the direction of the first axis, and a first end face and a second end face that are arranged in the direction of the first axis. The multimode waveguide mesa is connected to the waveguide mesa at a port on the first end face. The multimode waveguide mesa is connected to the first arm waveguide mesa at a first port on the second end face. The multimode waveguide mesa is connected to the second arm waveguide mesa at a second port on the second end face. The multimode waveguide mesa has a first side edge line shared by the top face and the first side face of the multimode waveguide mesa, and a rear edge line shared by the top face and the first end face of the multimode waveguide mesa. The first side edge line and the rear edge line meeting at an outer vertex, and the first side edge line forming an acute angle with the rear edge line at the outer vertex.

A multimode interferometer according to one aspect of the present invention includes: a multimode waveguide mesa having a top face extending in a direction of a first axis, a first side face and a second side face that extend in the direction of the first axis, and a first end face and a second end face arranged in the direction of the first axis; a waveguide mesa connected to the first end face at a port of the multimode waveguide mesa; a first waveguide mesa connected to the second end face at a first port of the multimode waveguide mesa; and a second waveguide mesa connected to the second end face at a second port of the multimode waveguide mesa. The multimode waveguide mesa has a first side edge line shared by the top face thereof and the first side face thereof, and an end line shared by the top face thereof and the first end face thereof. The first side edge line and the end line meet at an outer vertex, and the first side edge line forms an acute angle with the end line at the outer vertex.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

FIG. 6A is a graph showing the simulation result of characteristics of multimode interferometers.

FIG. 6B is a graph showing the simulation result of characteristics of multimode interferometers.

FIG. 6C is a graph showing the simulation result of characteristics of multimode interferometers.

DESCRIPTION OF THE EMBODIMENTS

Figure 1:
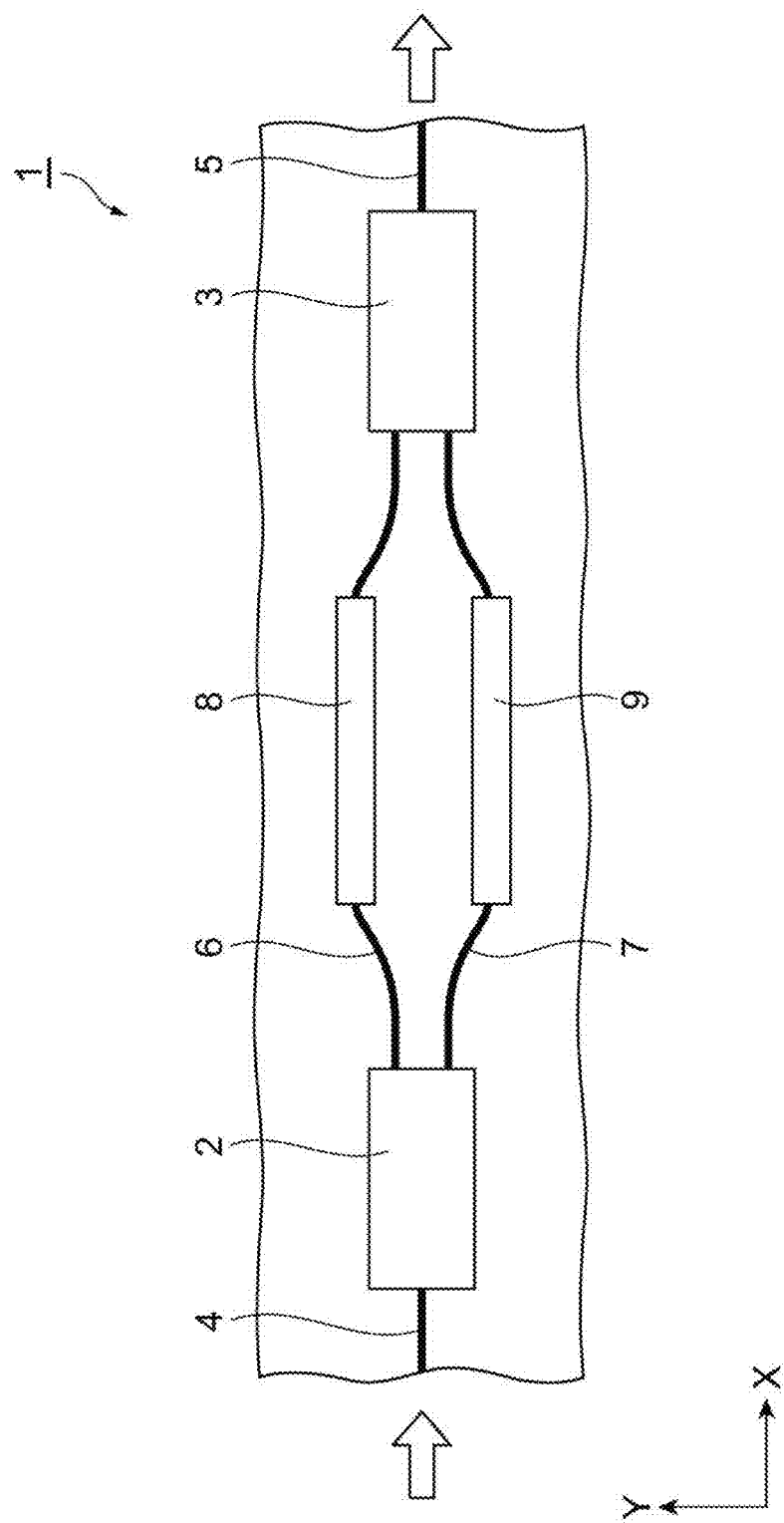
FIG. 1 is a schematic plan view showing an optical semiconductor device according to the present embodiment.

Multimode interferometers can be used for various optical devices, such as Mach-Zehnder modulators. They require a multimode interferometer therein to produce less stray light. For example, a Mach-Zehnder modulator includes multimode interferometers that branch and join two arm waveguides. The multimode interferometers, for example, the merger in the Mach-Zehnder modulator may produce stray light. The multimode interferometer of the merger has a pair of side faces extending in the waveguide direction, and one end face and the other end face, which are arranged in the waveguide direction. Specifically, the multimode interferometer receives light beams from the two arm waveguides at the one end face thereof; reflects multimode components, which are produced from the light beams thus received, at the side faces thereof to merge the light beams at the other end face; and provide the waveguide with the merged light beam. The inventor's findings reveal that the multimode interferometer may produce stray light. The occurrence of the stray light may degrade the performance, such as the extinction ratio of the Mach-Zehnder modulator. Such stray light in the multimode interferometer can occur in Mach-Zehnder modulators and other optical devices which use multimode interference.

It is an object of one aspect of the present invention to provide a multimode interferometer that can reduce stray light, and a Mach-Zehnder modulator including the multimode interferometer.

A description will be given of embodiments according to the above aspects.

A Mach-Zehnder modulator includes: (a) a first arm waveguide mesa; (b) a second arm waveguide mesa; (c) a waveguide mesa; and (d) a merger optically coupled to the first arm waveguide mesa, the second arm waveguide mesa, and the waveguide mesa. The merger includes a multimode waveguide mesa. The multimode waveguide mesa has a top face extending in a direction of a first axis, a first side face and a second side face that extend in the direction of the first axis, and a first end face and a second end face that are arranged in the direction of the first axis. The multimode waveguide mesa is connected to the waveguide mesa at a port on the first end face. The multimode waveguide mesa is connected to the first arm waveguide mesa at a first port on the second end face. The multimode waveguide mesa is connected to the second arm waveguide mesa at a second port on the second end face. The multimode waveguide mesa has a first side edge line shared by the first side face and the top face of the multimode waveguide mesa, and a front edge line shared by the first end face and the top of the multimode waveguide. The first side edge line and the front edge line meet at an outer vertex, and the first side edge line forms an acute angle with the front edge line at the outer vertex.

The Mach-Zehnder modulator allows the first side and front edge lines of the multimode waveguide mesa to form an acute angle at the outer vertex at which the first side and front edge lines meet. The multimode waveguide mesa enables propagation of optical multimode components. These multimode components are reflected by the first and second side faces of the multimode waveguide mesa to reach the first end face. The multimode waveguide mesa causes the light components at the first end face to travel from the port on the first end face to the waveguide mesa and outward refracts the light components at the part of the first end face away from the port. This refraction allows the multimode waveguide mesa to produce less stray light.

In the Mach-Zehnder modulator according to an embodiment, the merger includes a 2×1 multimode interferometer.

The Mach-Zehnder modulator allows 2×1 multimode interferometer to merge the light beams from the arm waveguide mesas.

In the Mach-Zehnder modulator according to an embodiment, the waveguide mesa includes a top face, a first side face and a second side face. The waveguide mesa has a first side edge line shared by the top face thereof and the first side face thereof, and a second side edge line shared by the top face thereof and the second side face thereof. The front edge line and the first side edge line of the waveguide mesa meet at a first inner vertex. The front edge line and the second side edge line of the waveguide mesa meet at a second inner vertex, and the front edge line of the multimode waveguide mesa forms an acute angle with a line passing through the first inner vertex and the second inner vertex.

The Mach-Zehnder modulator allows the multimode waveguide mesa to have an acute angle, which is formed by the front edge line and the line that passes through the first and second inner vertices, at the inner vertex where the line and the front edge line of the multimode waveguide mesa meet. The part, near the port, of the first end face can outward refract light components arriving at the first end face. This refraction can produce less stray light in the multimode waveguide mesa.

In the Mach-Zehnder modulator according to an embodiment, the front edge line extends along a first reference line. The multimode waveguide mesa has a rear edge line shared by the top face and the second end face in the multimode waveguide mesa. The rear edge line extends along a second reference line, and the first reference line and the second reference line form substantially the same angle as the acute angle at the first inner vertex.

In the Mach-Zehnder modulator, the second side and top faces of the multimode waveguide mesa share a second side edge line. The rear edge line meets the first side edge line at the third outer vertex and the second side edge line at the fourth outer vertex. The rear edge line forms a substantially right angle with the first side edge line at the third outer vertex, and forms a substantially right angle with the second side edge line at the fourth outer vertex.

A Mach-Zehnder modulator according to an embodiment includes: (a) a first arm waveguide mesa; (b) a second arm waveguide mesa; (c) a waveguide mesa; and (d) a divider optically coupled to the first arm waveguide mesa, the second arm waveguide mesa, and the waveguide mesa. The divider includes a multimode waveguide mesa. The multimode waveguide mesa has a top face extending in a direction of a first axis, a first side face and a second side face that extend in the direction of the first axis, and a first end face and a second end face that are arranged in the direction of the first axis. The multimode waveguide mesa is connected to the waveguide mesa at a port on the first end face. The multimode waveguide mesa is connected to the first arm waveguide mesa at a first port on the second end face. The multimode waveguide mesa is connected to the second arm waveguide mesa at a second port on the second end face.

The multimode waveguide mesa has a first side edge line shared by the top and first side faces of the multimode waveguide mesa, and a rear edge line shared by the top face and the first end face of the multimode waveguide mesa. The first side edge line and the front edge line meets at an outer vertex, and the first side edge line forms an acute angle with the rear edge line at the outer vertex.

In the Mach-Zehnder modulator, the multimode waveguide mesa, which is connected to the arm waveguide mesas, may receive stray light from the arm waveguide mesas. The multimode waveguide mesa let the light component of stray light propagate in the direction opposite to that of light from the arm waveguide mesas. The light component is reflected by the first and second side faces of the multimode waveguide mesa toward the first end face. The first side and front edge lines of the multimode waveguide mesa form an acute angle at the outer vertex where the first side and front edge lines of the multimode waveguide mesa meet. A part of the first end face apart from the port refracts a portion of the light component outward. This refraction can leave less stray light in the multimode waveguide mesa.

The Mach-Zehnder modulator according to an embodiment, the divider includes a 1×2 multimode interferometer.

The Mach-Zehnder modulator allows 1×2 multimode interferometer to branch a light beam to the arm waveguide mesas.

The Mach-Zehnder modulator according to an embodiment, the waveguide mesa includes a top face, a first side face and a second side face. The waveguide mesa has a first side edge line shared by the top face thereof and the first side face thereof, and a second side edge line shared by the top face thereof and the second side face thereof. The rear edge line and the first side edge line of the waveguide mesa meet at a first inner vertex. The rear edge line and the second side edge line of the waveguide mesa meet at a second inner vertex. The rear edge line of the multimode waveguide mesa forms an acute angle with a line passing through the first inner vertex and the second inner vertex.

The Mach-Zehnder modulator allows the multimode waveguide mesa to from an acute angle with the front edge line and the line, passing through the first and second inner vertices, at the first inner vertex. The first end face outwardly refracts light component arriving at the first end face in a part slightly away from the port. This refraction can leave less stray light in the multimode waveguide mesa.

In the Mach-Zehnder modulator according to an embodiment, the rear edge line extends along a first reference line. The multimode waveguide mesa has a front edge line shared by the top face thereof and the second end face thereof. The front edge line extends along a second reference line, and the first reference line and the second reference line form substantially the same angle as the acute angle at the first inner vertex.

The Mach-Zehnder modulator allows the multimode waveguide mesa to have the second side edge line that the second side and top faces share. The front edge line meets the second side edge line at the third outer vertex and meets the second side edge line at the fourth outer vertex. The front edge line forms a substantially right angle with the first side edge line at the third outer vertex, and forms a substantially right angle with the second side edge line at the fourth outer vertex.

A multimode interferometer according to an embodiment includes: (a) a multimode waveguide mesa having a top face extending in a direction of a first axis, a first side face and a second side face that extend in the direction of the first axis, and a first end face and a second end face arranged in the direction of the first axis; (b) a waveguide mesa connected to the first end face at a port of the multimode waveguide mesa; (c) a first waveguide mesa connected to the second end face at a first port of the multimode waveguide mesa; and (d) a second waveguide mesa connected to the second end face at a second port of the multimode waveguide mesa. The multimode waveguide mesa has a first side edge line shared by the top face thereof and the first side face thereof, and an end line shared by the top face thereof and the first end face thereof. The first side edge line and the end line meet at an outer vertex, and the first side edge line forms an acute angle with the end line at the outer vertex.

The multimode interferometer allows the first end face forming an acute angle at the outer vertex to refract light components missing the port toward the outside of the multimode waveguide mesa.

In the multimode interferometer according to an embodiment, the waveguide mesa includes a top face, a first side face and a second side face. The waveguide mesa has a first side edge line shared by the top face thereof and the first side face thereof, and a second side edge line shared by the top face thereof and the second side face thereof. The end line and the first side edge line of the waveguide mesa meet at a first inner vertex. The end line of the multimode waveguide mesa and the second side edge line of the waveguide mesa meet at a second inner vertex, and the end line forms an acute angle with a line passing through the first inner vertex and the second inner vertex.

The multimode interferometer allows the first end face forming an acute angle at the first inner vertex to refract, toward the outside of the multimode waveguide mesa, light components missing the port.

The teachings of the present invention can be readily understood by considering the following detailed description with reference to the accompanying drawings shown as examples. Referring to the accompanying drawings, embodiments according to a multimode interferometer and a Mach-Zehnder modulation device will be illustrated below. When possible, the same portions will be denoted by the same reference numerals.

FIG. 1 is a schematic plan view showing an optical semiconductor device according to the present embodiment. In FIG. 1, an XY coordinate system is depicted. In the embodiment, the optical semiconductor device includes a Mach-Zehnder modulator 1. The Mach-Zehnder modulator 1 includes a multimode interferometer 2 for an optical divider, a second multimode interferometer 3 for an optical merger, an input waveguide mesa 4 for receiving input light, an output waveguide mesa 5 for providing output light, a first arm waveguide mesa 6, a second arm waveguide mesa 7, a first electrode 8, and a second electrode 9. The Mach-Zehnder modulator 1 receives a continuous light beam from the input waveguide mesa 4 and outputs a modulated light beam to the output waveguide mesa 5. The first and second arm waveguide mesas 6 and 7 connect the first and second multimode interferometers 2 and 3. The input waveguide mesa 4, the output waveguide mesa 5, the first and second arm waveguide mesas 6 and 7 enable single mode propagation.

Figure 2A:
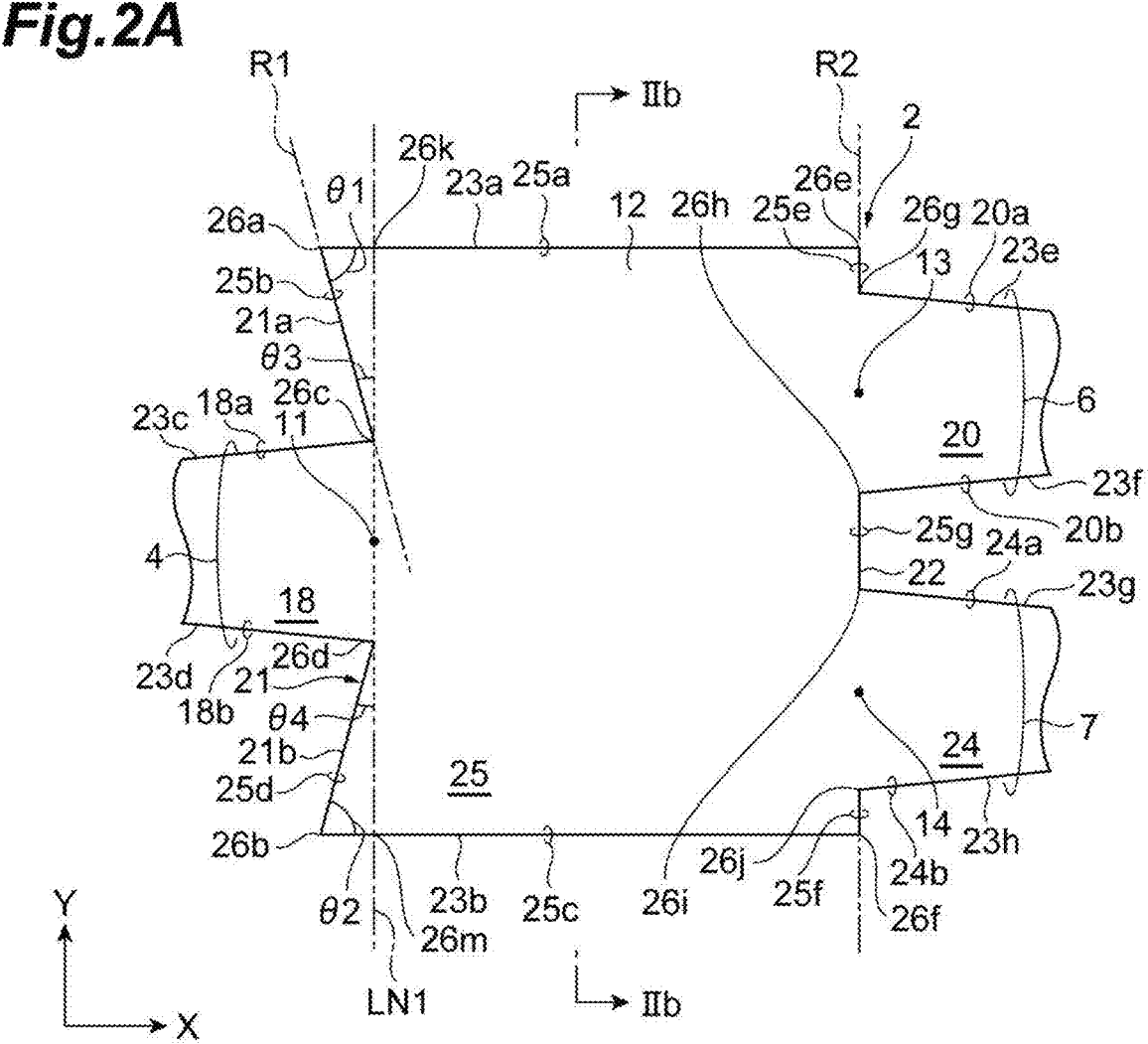
FIG. 2A is a view showing a multimode interferometer for an optical semiconductor device according to the embodiment.
Figure 2B:
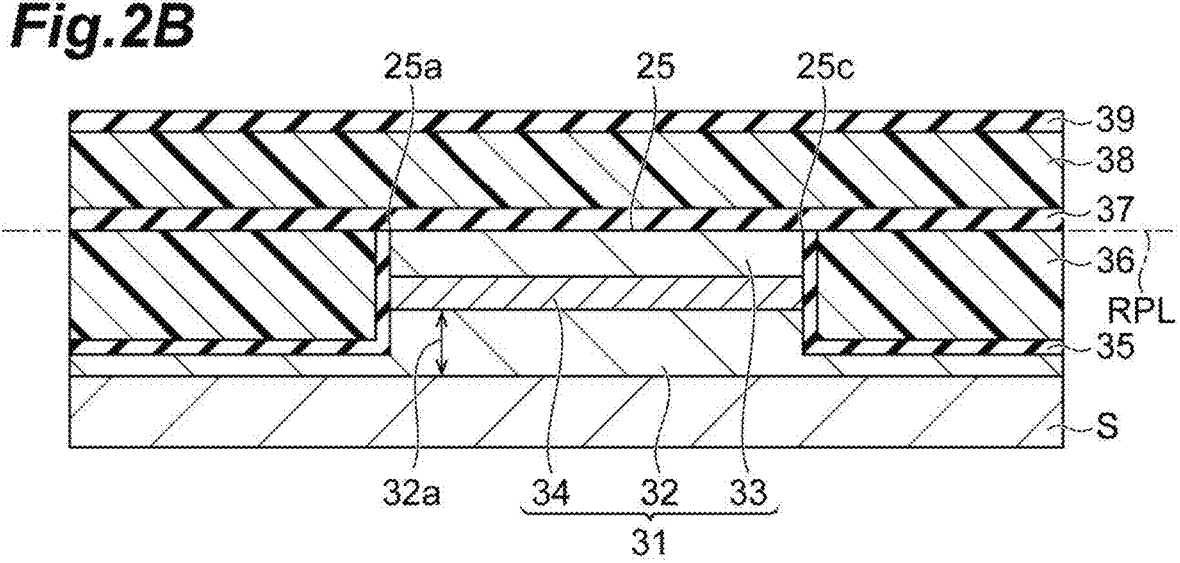
FIG. 2B is a cross sectional view, taken along line IIb-IIb line shown in FIG. 2A, showing the multimode interferometer according to the embodiment.

FIG. 2A is a schematic view showing a multimode interferometer for an optical semiconductor device according to the present embodiment. FIG. 2B is a cross-sectional view taken along line IIb-IIb shown in FIG. 2A. In FIG. 2A, an XY orthogonal coordinate system is depicted.

FIGS. 1, 2A and 2B, the Mach-Zehnder modulator 1 includes the input waveguide mesa 4, the first and second arm waveguide mesas 6 and 7, and a multimode waveguide mesa 12 for the multimode interferometer 2 (the divider). The optical divider including the multimode waveguide mesa 12 is optically coupled to the input waveguide mesa 4, and the first and second arm waveguide mesas 6 and 7. In the embodiment, the optical divider has a 1×2 multimode interferometer, and in the Mach-Zehnder modulator 1, the 1×2 multimode interferometer distributes light to the arm waveguide mesas (6 and 7). The multimode waveguide mesa 12 includes a first end face 21 and a second end face 22, a first side face 23a, and a second side face 23b, and a substantially flat top face 25 extending along a reference face RPL. The first side face 23a is opposite to the second side face 23b. The first and second side faces 23a and 23b and the top face 25 extend in a direction of a first axis Ax1, which extends in the direction from one of the first and second end faces 21 and 22 to the other. The first and second end faces 21 and 22 are arranged in the direction of the first axis Ax1. The first end face 21 is opposite to the second end face 22.

The multimode waveguide mesa 12 is connected to the input waveguide mesa 4 at the position of the port 11 on the first end face 21, and is connected to the first arm waveguide mesa 6 and the second arm waveguide mesa 7 at the respective positions of the first port 13 and the second port 14 on the second end face 22.

In the multimode waveguide mesa 12, the top face 25 and the first side face 23a share a first side edge line 25a, and the top face 25 and the first end face 21 (specifically, the first portion 21a) share a rear edge line 25b. The first side and rear edge lines 25a and 25b form an acute angle (θ1) at the outer vertex 26a. This acute angle is defined as an angle between the tangents to the first side edge line 25a at the outer vertex 26a and the rear edge line 25b at the outer vertex 26a. This definition using tangents is applied to angles at an "outer vertex" and an "inner vertex" that will be described below.

The Mach-Zehnder modulator 1, the multimode waveguide mesa 12 may receive stray light returning from the arm waveguide mesas (6 and 7). The multimode waveguide mesa 12 lets light propagate in the opposite direction. The return stray light is reflected by the first and second side faces 23a and 23b to the first end face 21. The first side edge line 25a and the rear edge line 25b of the multimode waveguide mesa 12 form an acute angle at the outer vertex 26a where the first side edge line 25a and the rear edge line 25b of the multimode waveguide mesa 12 meet. Light components that reach the first end face 21 remote from the port of the first end face 21 is refracted outward at the first end face 21. This refraction allows the multimode waveguide mesa 12 to reduce stray light.

In the Mach-Zehnder modulator 1, the multimode waveguide mesa 12 has a second side edge line 25c, which the top face 25 and the first face 25b share, and has a rear edge line 25d, which the top face 25 and the end face 21 (the second portion 21b) share. The second side edge line 25c and the rear edge line 25d form an acute angle (θ2) at an outer vertex 26b where the second side edge line 25c and the rear edge line 25d meet.

The Mach-Zehnder modulator 1 allows the multimode waveguide mesa 12 to reflect the stray light at the first and second side faces 23a and 23b, so that the light components reaches the first end face 21. The acute angle at the outer vertex 26b, which is formed by the second side edge line 25c and the rear edge line 25d, allows the multimode waveguide mesa 12 to refract a part of the return light components outward at the part of the first end face 21 which is remote from the port on the first end face 21. This refraction allows multimode waveguide mesa 12 to reduce stray light.

The acute angle (θ2) at the outer vertex 26b can be substantially the same as the acute angle (θ1) at the outer vertex 26a under the manufacturing variations, but they are not limited to the relationship of these acute angles (θ1 and θ2). The acute angle (θ1) can be in, for example, an angular range of 45 to 90 degrees. The acute angle (θ2) can be in, for example, an angular range of 45 to 90 degrees.

In the Mach-Zehnder modulator 1, the input waveguide mesa 4 has a substantially flat top face 18, a first side face 23c, and a second side face 23d, and the top face 18 extends along the reference plane RPL. The top face 18 adjoins to the top face 25, and the top faces 18 and 25 extend along the reference plane RPL.

The input waveguide mesa 4 has a first side edge line 18a, which the top face 18 and the first side face 23c share, and a second side edge line 18b, which the upper surface 18 and the second side face 23d share. The rear edge line 25b of the multimode waveguide mesa 12 and the first side edge line 18a of the input waveguide mesa 4 meet at a first inner vertex 26c, and the rear edge line 25d of the multimode waveguide mesa 12 and the second side face 23d of the input waveguide mesa 4 meet at a second inner vertex 26d.

The rear edge line 25d of the multimode waveguide mesa 12 forms an acute angle (θ3) at the first inner vertex 26c with the straight line LN1 that passes through the first and second inner vertices 26c and 26d.

In the Mach-Zehnder modulator 1, the inclination of the first end face 21 at the acute angle (θ3) on the first inner vertex 26c allows the multimode waveguide mesa 12 to refract the light component outward at the part of the first end face 21 apart from the port 11. This refraction allows the multimode waveguide mesa 12 to reduce stray light.

In the Mach-Zehnder modulator 1, the rear edge line 25d forms an acute angle (θ4) with the straight line LN1 at the second inner vertex 26d.

In the Mach-Zehnder modulator 1, the inclination of the first end face 21 at the acute angle (θ4) on the second inner vertex 26d allows the multimode waveguide mesa 12 to refract the light component outward at the part of the first end face 21 slightly apart from the port 11. This refraction allows the multimode waveguide mesa 12 to reduce stray light.

The first end face 21, the second end face 22, the top face 25, the first side face 23a, and the second side face 23b of the multimode waveguide mesa 12 are covered with an inorganic insulating film. The top face 18, the first side face 23c and the second side face 23d of the input waveguide mesa 4 are also covered with the inorganic insulating film.

In the Mach-Zehnder modulator 1, the multimode waveguide mesa 12 has front edge lines 25e, 25f, and 25g, which the second end face 22 and the top face 25 share. The front edge line 25e and the first side edge line 25a meet at the outer vertex 26e. The front edge line 25f and the second side edge line 25c meet at the outer vertex 26f.

In the Mach-Zehnder modulator 1, the first arm waveguide mesa 6 includes a top face 20, a first side face 23e and a second side face 23f. The first arm waveguide mesa 6 has a first side edge line 20a, which the top face 20 and the first side face 23e share, and a second side edge line 20b, which the top face 20 and the second side face 23f share. The first side edge line 24a meets the front edge line 25g at the inner vertex 26g. The second side edge line 20b meets the front edge line 25g at the inner vertex 26h.

The second arm waveguide mesa 7 includes a top face 24, a first side face 23g, and a second side face 23h. The second arm waveguide mesa 7 has a first side edge line 24a, which the top face 24 and the first side face 23g share, and a second side edge line 24b, which the top surface 24 and the second side face 23h share. The first side edge line 24a meets the front edge line 25g at the inner vertex 26i. The second side edge line 20b meets the front edge line 25f at the inner vertex 26j.

In the Mach-Zehnder modulator 1, for example, the rear edge line 25b of the first end face 21 extends along a first reference line R1. Further, the front edge lines 25e, 25f, and 25g of the second end face 22 extend along a second reference line R2. In the present embodiment, the first reference line R1 may be inclined at an angle substantially equal to the angle θ3 with the second reference line R2 under manufacturing variations. In the Mach-Zehnder modulator, the front edge line 25f meets the second side edge line 25c at the outer vertex 26f, and the front edge line 25e is substantially perpendicular to the first side edge line 25a at the outer vertex 26e under manufacturing variations. The front edge line 25h is substantially perpendicular to the second side edge line 25c at the outer vertex 26f under manufacturing variations.

In the present embodiment, the first side edge line 25a of the first side face 23a and the second side edge line 25c of the second side face 23b intersect the straight line LN1 at vertices 26k and 26m, respectively. The first portion 21a of the first end face 21 can be oriented such that the sum of the angles θ1 and θ3 is equal to a right angle, and alternatively the first portion 21a can be oriented such that the sum of the angles θ1 and θ3 is less than a right angle. The second portion 21b of the first end face 21 can be shaped such that the sum of the angles θ2 and θ4 is a right angle, and alternately can be shaped such that the sum of the angles θ2 and θ4 is less than a right angle.

Specifically, as shown in FIG. 2B, the multimode waveguide mesa 12 has a semiconductor laminate 31 on a semiconductor substrate S. The semiconductor laminate 31 is provided with the lower cladding layer 32, the upper cladding layer 33, and the core layer 34. The lower and upper cladding layers 32 and 33 are disposed on the semiconductor substrate S, and the core layer 34 is disposed between the lower and upper cladding layers 32 and 33. In addition to the multimode waveguide mesa 12, the input waveguide mesa 4, the first arm waveguide mesa 6, and the second arm waveguide mesa 7 each include the semiconductor laminate 31.

The semiconductor laminate 31 has upper and side faces, which are covered with an inorganic insulating film. Specifically, the upper and side faces of the semiconductor laminate 31 are covered with the inorganic insulating film 35. The semiconductor laminate 31 and the inorganic insulating film 35 are embedded with a planarization film 36. The semiconductor laminate 31, the inorganic insulating film 35, and the planarization film 36 are covered with an inorganic insulating film 37. The inorganic insulating film 37 is covered with another planarization film 38, and the planarization film 38 is covered with the inorganic insulating film 39.

Exemplary multimode waveguide mesa 12.
Width of the second end face 22 in total: 13.6 micrometers.
Spacing between the second end face 22 and the straight line LN: 194 micrometers.
Thickness 32a of the lower cladding layer 32: about 1.5 micrometers.
Thickness of the upper cladding layer 33: about 1.4 micrometers.
Thickness of core layer 34: about 0.5 micrometer.
Refractive indices of the lower and upper cladding layers 32 and 33: approximately 3.1.
Refractive index of the core layer 34: about 3.4.
Embedding structure.
Inorganic insulating film 39: silicon-based inorganic insulating material, for example, silicon oxide ($SiO_2$).
Inorganic insulating films 35 and 37: silicon-based inorganic insulator, for example, silicon oxynitride (SiON).
Thicknesses of the inorganic insulating films 35 and 37: for example, about 300 nm.
Refractive indices of the inorganic insulating films 35 and 37: for example, about 1.7.
Planarization films 36 and 38: Resin body, for example, benzocyclobutene (BCB).

The semiconductor laminate 31 is fabricated as follows. For example, a semiconductor layer is epitaxially grown on the semiconductor substrate S to obtain an epitaxial substrate. The epitaxial substrate is processed by photolithography and etching to obtain a semiconductor laminate 31. The semiconductor laminate 31 is embedded by the above-described embedding structure.

The first end face 21 reflects light traveling in a direction from the second end face 22 to the first end face 21 outward at the first and second portions 21a and 21b. The acute angles (θ3 and θ4) can be in a range of 15 degrees or more and 40 degrees or less. In terms of the refractive indices of the semiconductor of the multimode waveguide mesa 12 and the medium outside the multimode waveguide mesa 12, the acute angles (θ3 and θ4) can be in angles at or near the Brewster angle, and in the present embodiment, is, for example, in a range of 25 to 35 degrees.

Figure 3A:
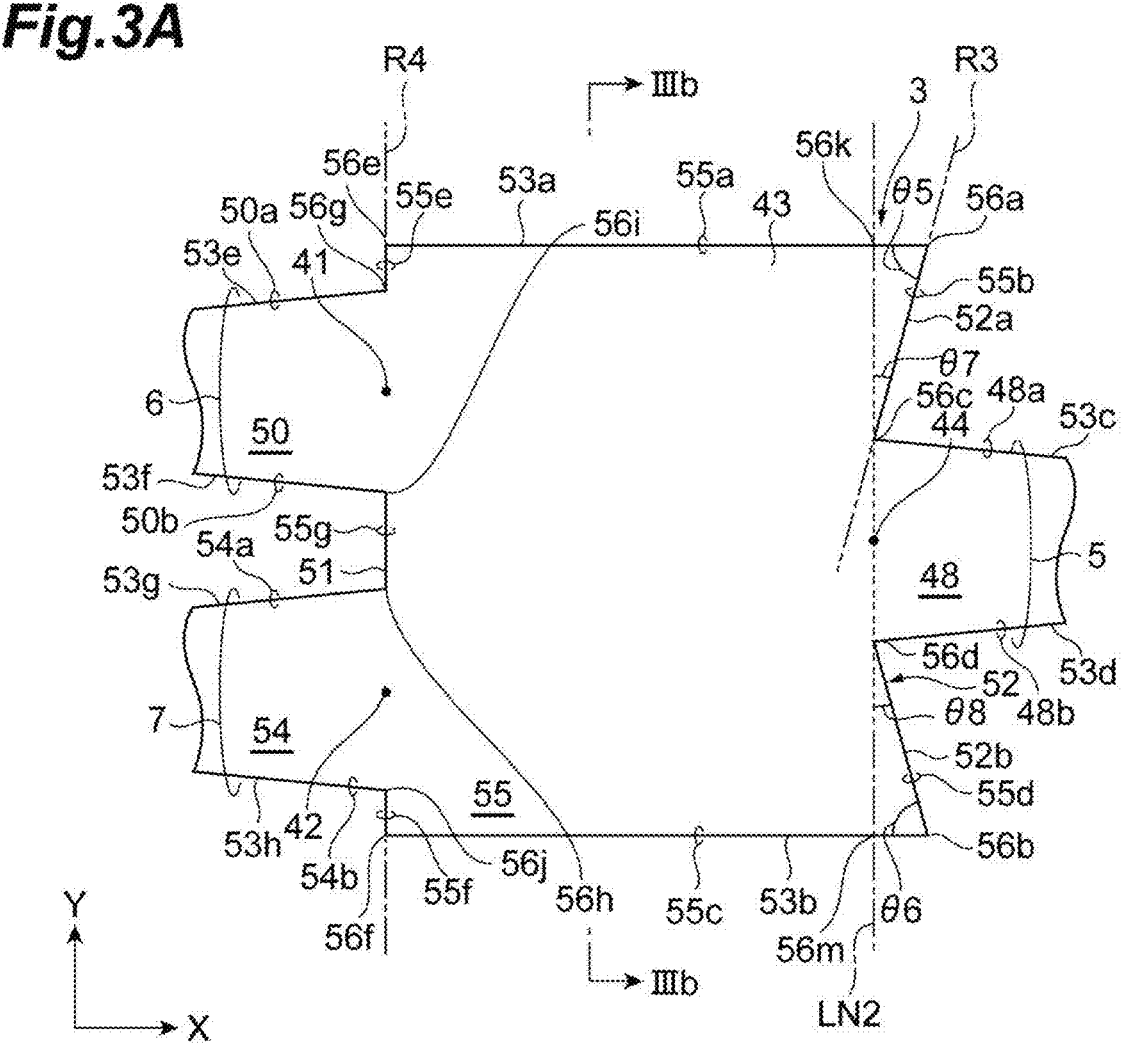
FIG. 3A is a view showing a multimode interferometer for an optical semiconductor device according to the embodiment.
Figure 3B:
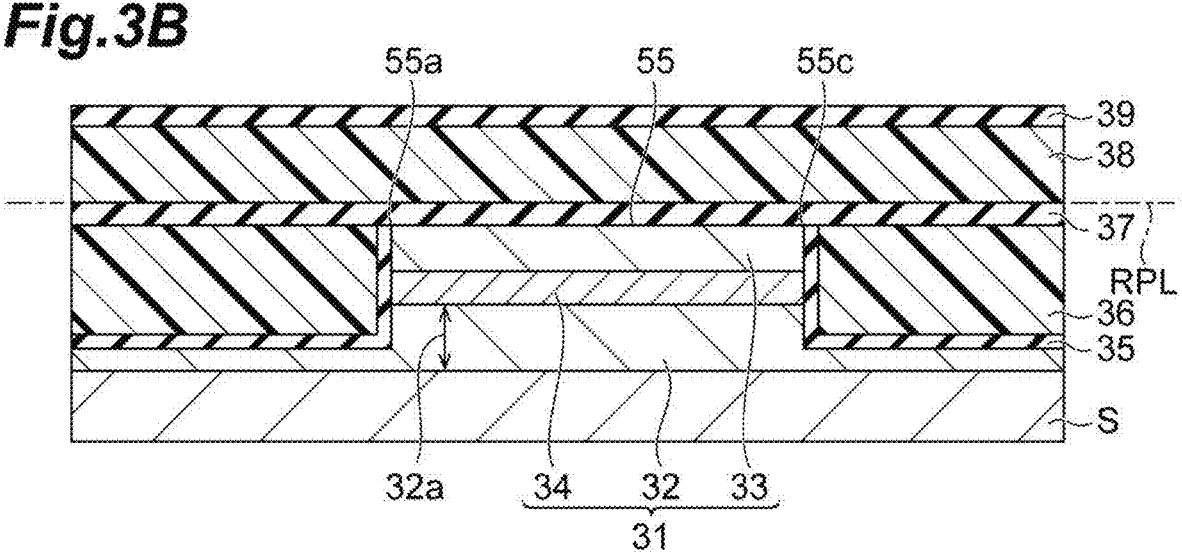
FIG. 3B is a cross sectional view, taken along line IIIb-IIIb line shown in FIG. 3A, showing the multimode interferometer according to the embodiment.

FIG. 3A is a schematic view showing a second multimode interferometer for an optical semiconductor device according to the present embodiment. FIG. 3B is a cross-sectional view taken along line IIIb-IIIb shown in FIG. 3A. In FIG. 3A, an XY orthogonal coordinate system is depicted.

The Mach-Zehnder modulator 1 includes the output waveguide mesa 5, the first arm waveguide mesa 6, the second arm waveguide mesa 7, and a multimode waveguide mesa 43 for the second multimode interferometer 3 (a merger). The optical merger of the multimode waveguide mesa 43 is optically coupled to the output waveguide mesa 5, the first arm waveguide mesa 6 and the second arm waveguide mesa 7. In the present embodiment, the optical merger includes a 2×1 multimode interferometer, and the Mach-Zehnder modulator 1 uses the 2×1 multimode interferometer to merge light beams from the arm waveguide mesas (6 and 7). The multimode waveguide mesa 43 includes first and second end faces 52 and 51, first and second side faces 53a and 53b, and a substantially flat top face 55 extending along the reference face RPL. The first side face 53a is on the side opposite to the second side face 53b. The first and second side faces 53a and 53b, and the top face 55 extend from one of the first and second end faces 52 and 51 to the other in the direction of the second axis. The first and second end faces 52 and 51 are arranged in the direction of the second axis. The first end face 52 is on the opposite side of the second end face 51.

The multimode waveguide mesa 43 is connected to the output waveguide mesa 5 at the position of the port 44 on the first end face 52. The multimode waveguide mesa 43 is connected to the first arm waveguide mesa 6 at the position of the first port 41 on the second end face 51 and to the second arm waveguide mesa 7 at the position of the second port 42 on the second end face 51.

The multimode waveguide mesa 43 has a first side edge line 55a, which the top face 55 and the first side face 53a share, and a front edge line 55*b*, which the top face 55 and the second end face 53*a* share. The first and second side edge lines 55*a* and 55*b* of the multimode waveguide mesa 43 form an acute angle (θ5) at the outer vertex 56*a* where the first side edge line 55*a* and the front edge line 55*b* meet.

The Mach-Zehnder modulator 1 provides the multimode waveguide mesa 43 with an acute angle (θ5), which the first side edge line 55*a* and the front edge line 55*b* form at the outer vertex 56*a*. The multimode waveguide mesa 43 allows the multimode light components to propagate. The multimode waveguide mesa 43 can reflect multimode light components at the first and second side faces 53*a* and 53*b* to the first end face 52. The light component at the first end face 52 enters the output waveguide mesa 5 at the port on the first end face 52, and is refracted outwardly at the first end face 52 apart from the port 44. This refraction allows the multimode waveguide mesa 43 to reduce the occurrence of stray light.

In the Mach-Zehnder modulator 1, the multimode waveguide mesa 43 has a second side edge line 55*c*, which the top face 55 and the second side face 53*b* share, and a front edge line 55*d*, which the top face 55 and the end face 52 (the second portion 52 *b*) share. The multimode waveguide mesa 43 has an acute angle (θ6) formed by the second side edge line 55*c* and the front edge line 55*d* at the outer vertex 56*b* where the second side edge line 55*c* and the front edge line 55*d* meet.

The Mach-Zehnder modulator 1 allows the multimode waveguide mesa 43 to reflect the light component at the first and second side faces 53*a* and 53*b* to the first end face 52. In the multimode waveguide mesa 43, the second side edge line 55*c* forms an acute angle with the front edge 55*d* at the outer vertex 56*b*. The multimode waveguide mesa 43 outwardly refracts most of the light component at the part, apart from the port on the first end face 52, of the first end face 52. This refraction allows the multimode waveguide mesa 43 to reduce the occurrence of stray light.

The acute angle (θ6) at the outer vertex 56*b* can be substantially the same as the acute angle (θ5) at the outer vertex 56*a* under manufacturing variations, but these angles (θ5 and θ6) are not limited thereto. The acute angle (θ5) can be, for example, a range of 45 to 90 degrees. The acute angle (θ6) can be, for example, a range of 45 to 90 degrees.

In the Mach-Zehnder modulator 1, the output waveguide mesa 5 has first and second side faces 53*c* and 53*d*, and a substantially flat top face 48 extending along the reference surface RPL. The top face 48 adjoins the top face 55, and the top faces 48 and 50 extend along the reference surface RPL.

The output waveguide mesa 5 has a first side edge line 48*a*, which the top face 48 and the first side face 53*c* share, and a second side edge line 48*b*, which the upper surface 48 and the second side face 53*d* share. In the output waveguide mesa 5, the front edge line 55*b* and the first side edge line 48*a* meet at the first inner vertex 56*c*, and the front edge line 55*d* and the second side edge line 48*b* meet at the second inner vertex 56*d*.

In the multimode waveguide mesa 43, the front edge line 55*b* forms an acute angle (θ7) at the first inner vertex 56*c* with a straight line LN2 passing through the first and second inner vertices 56*c* and 56*d*.

The Mach-Zehnder modulator 1 provides the multimode waveguide mesa 43 with the first end face 52 inclined so as to form an acute angle (θ7) at the first inner vertex 56*c*. The multimode waveguide mesa 43 refracts the light component at the part, slightly away from the port 44, of the first end face 52 outwardly. This refraction allows the multimode waveguide mesa 43 to reduce the occurrence of stray light.

In the Mach-Zehnder modulator 1, the multimode waveguide mesa 43 allows the front edge line 55*d* to form an acute angle (θ8) at the second inner vertex 56*d* with the straight line LN2.

In the Mach-Zehnder modulator 1, the inclination of the first end face 52 at an acute angle (θ8) at the second inner vertex 56*d* allows the multimode waveguide mesa 43 to outward refract the light component at the part, slightly away from the port 44, of the first end face 52. This refraction allows the multimode waveguide mesa 43 to reduce the occurrence of stray light.

The acute angle (θ8) of the second inner vertex 56*d* can be substantially the same as the acute angle (θ7) of the first inner vertex 56*c* under manufacturing variations, but the acute angles (θ7 and θ8) are not limited thereto. The acute angle (θ7) can be in a range of, for example, not less than zero degrees and 45 degrees or less, and can be in a range of 15 degrees or more and 40 degrees or less. The acute angle (θ8) may be in a range of, for example, not less than zero degrees and 45 degrees or less, and may be in a range of 15 degrees or more and 40 degrees or less. Too large angles (in θ7 and θ8) may hinder the supply of etching gas near the first and second inner vertices 56*c* and 56*d* in forming the semiconductor mesa by dry etching.

In the Mach-Zehnder modulator 1, the multimode waveguide mesa has rear edge lines 55*e*, 55*f*, and 55*g*, which the second end face 51 and the top face 55 share. The rear edge line 55*e* and the first side edge line 55*a* meet at the outer vertex 56*e*. The rear edge 55*f* and the second side edge line 55*c* meet at the outer vertex 56*f*.

In the Mach-Zehnder modulator 1, the first arm waveguide mesa 6 has first and second side faces 53*e* and 53*f*, and a substantially flat top face 50 extending along the reference surface RPL. The first arm waveguide mesa 6 has a first side edge line 50*a*, which the top face 50 and the first side face 53*e* share, and a second side edge line 50*b*, which the top face 50 and the second side surface 53*f* share. The first side edge line 50*a* meets the rear edge line 55*e* at the inner vertex 56*g*. The second side edge line 50*b* meets the rear edge line 55*g* at inner vertex 56*i*.

The second arm waveguide mesa 7 has first and second side faces 53*g* and 53*h*, and a substantially flat top face 54 extending along the reference plane RPL. The second arm waveguide mesa 7 has a first side edge line 54*a*, which the top face 54 and the first side face 53*g* share, and a second side edge line 54*b*, which the top face 54 and the second side face 53*h* share. The first side edge line 54*a* meets the rear edge line 55*g* at the inner vertex 56*h*, and the second side edge line 54*b* meets the rear edge line 55*f* at the inner vertex 56*j*.

In the Mach-Zehnder modulator 1, for example, the front edge line 55*b* of the first end face 52 extends along a first reference line R3. Further, the rear edge lines 55*e*, 55*f*, and 55*g* of the second end face 51 extend along a second reference line R4. In the present embodiment, the first reference line R3 may be inclined with the second reference line R4 at an angle substantially equal to the angle θ7 under manufacturing variations.

In the Mach-Zehnder modulator, the rear edge line 55*e* meets the first side edge line 55*a* at the outer vertex 56*e*. The rear edge line 55*e* is substantially perpendicular to the first side edge line 25*a* at the outer vertex 56*e* under manufacturing variations. The rear edge line 55*f* meets the second side edge line 55*c* at the outer vertex 56*f*. The rear edge line 55*f* is substantially perpendicular to the second side edge line 55*c* at the outer vertex 56*f* under manufacturing variations.

In the present embodiment, the first side face 53a and the second side face 53b intersect the straight line LN2 at the intersecting vertices 56k and 56m. Specifically, in the first portion 52a (the second portion 52b) of the first end face 52, the distance between the front edge line 55b and the straight line LN2 monotonically decreases from the distance between the intersecting vertex 56k and the outer vertex 56a in a direction from the intersection vertex 56k (or the outer vertex 56a) to the first inner vertex 56c.

The first portion 52a of the first end face 52 can be oriented such that the sum of the angles θ5 and θ7 is equal to 90 degrees, and alternatively the sum of the angles θ5 and θ7 is less than 90 degrees. The second portion 52b of the first end face 52 may be oriented so that the sum of the angles θ6 and θ8 is equal to 90 degrees, and alternatively the sum of the angles θ6 and θ8 is less than 90 degrees.

In the multimode waveguide mesa 43, the top face 55, the first side face 53a and the second side face 53b are covered with an inorganic insulating film. In the output waveguide mesa 5, the top face 48, the first side face 53c and the second side face 53d are covered with an inorganic insulating film.

As shown in FIG. 3B, specifically, the multimode waveguide mesa 43 is also provided with the semiconductor laminate 31, and the semiconductor laminate 31 includes a lower cladding layer 32, an upper cladding layer 33, and a core layer 34. The lower and upper cladding layers 32 and 33 are disposed on the semiconductor substrate S, and the core layer 34 is disposed between the lower and upper cladding layers 32 and 33. The multimode waveguide mesa 43, the output waveguide mesa 5, the first arm waveguide mesa 6 and the second arm waveguide mesa 7 each are provided with the semiconductor laminate 31.

The first end face 52 reflects light traveling in a direction from the second end face 51 to the first end face 52 at the first and second portions 52a and 52b outward. The acute angles (θ7 and θ8) can be in a range of 15 degrees or more and 40 degrees or less. In terms of the refractive indices of the semiconductor of the multimode waveguide mesa 43 and the medium covering the multimode waveguide mesa 43, the acute angles (θ7 and θ8) can be at or near the Brewster angle. Such an angle is, for example, in a range of 25 to 35 degrees in the present embodiment.

Referring again to FIG. 1, the Mach-Zehnder modulator 1 modulates phases of the light beams, which propagates through the first and second arm waveguide mesas 6 and 7, with the first and second electrodes 8 and 9. Specifically, the first electrode 8 is disposed on the first arm waveguide mesa 6, and applies a drive signal to the first arm waveguide mesa 6 via the wiring metal layer. The second electrode 9 is disposed on the second arm waveguide mesa 7, and applies a drive signal to the second arm waveguide mesa 7 via the wiring metal layer. In response to the voltage on the first electrode 8, the first arm waveguide mesa 6 changes the phase of the light beam. Similarly, in response to the voltage on the second electrode 9, the second arm waveguide mesa 7 changes the phase of the light beam. The optical merger can merge light beams from the waveguide mesas to produce a single light beam therefrom In response to the two incident light beams of the same phase, the second multimode interferometer 3 generates a light beam with a large amplitude, which will be referred to as an "ON-STATE" in the following description. In response to the two incident light beams of opposite phases, the second multimode interferometer 3 generates a light beam with a very small amplitude, substantially zero, which is referred to as an "OFF-STATE" in the following description. The extinction ratio in the Mach-Zehnder modulator 1 is defined as the ratio (ION/IOFF) of the output light intensity ION in the ON-STATE to the output light intensity IOFF in the OFF-STATE. The second multimode interferometer 3 according to the present embodiment can improve the extinction ratio of the Mach-Zehnder modulator 1. In addition, the multimode interferometer 2 and the second multimode interferometer 3 according to the present embodiment can reduce stray light in the Mach-Zehnder modulator 1.

As understood from the above description, the Mach-Zehnder modulator 1 having at least one of the first and second multimode interferometers 2 and 3 enables high quality in optical modulation. Specifically, the Mach-Zehnder modulator 1 can include both the first and second multimode interferometers 2 and 3, or either the multimode interferometer 2 or the second multimode interferometer 3.

If necessary, the Mach-Zehnder modulator 1 may provide the optical merger with the second multimode interferometer 3, and provides the optical divider with another multimode interferometer of a structure different from the multimode interferometer 2. Alternatively, the Mach-Zehnder modulator 1 may provide the optical divider with the multimode interferometer 2, and may provide the optical merger with another multimode interferometer of a structure different from the second multimode interferometer 3. The Mach-Zehnder modulator 1 enables high-quality in optical transmission.

Figure 4A:
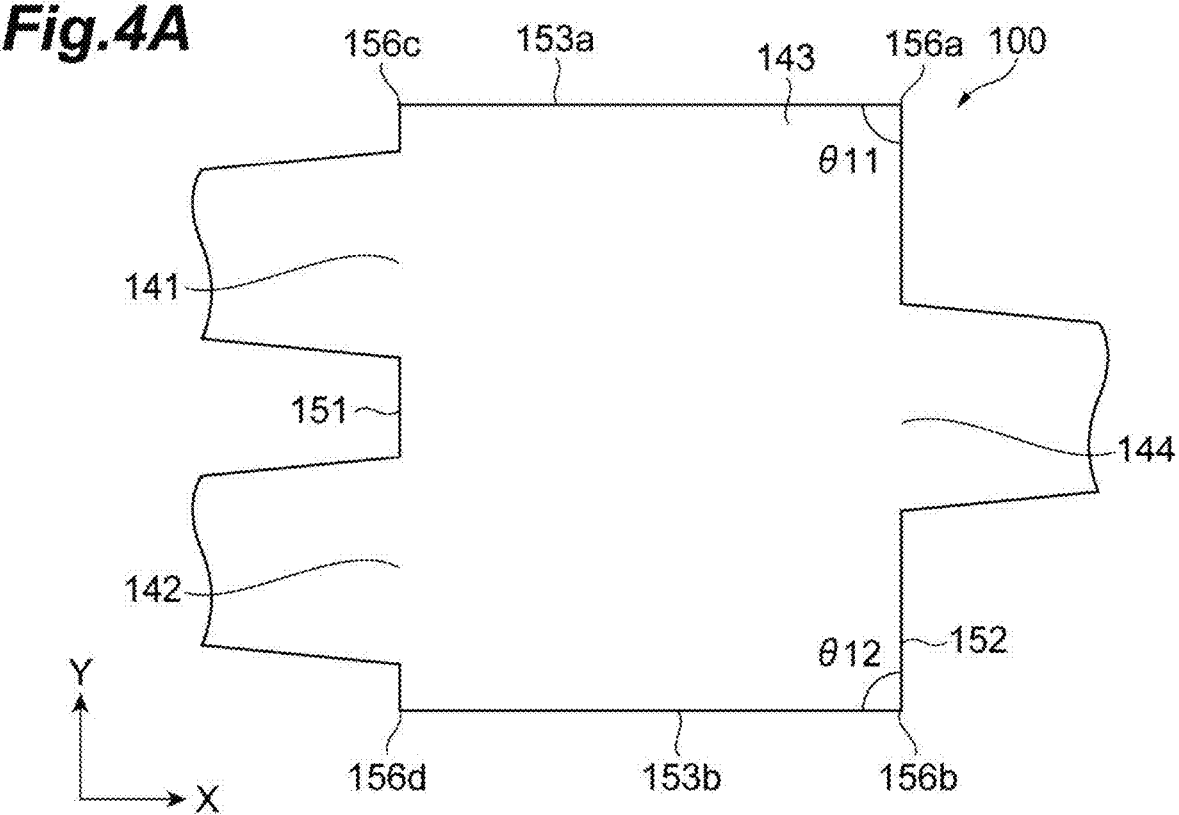
FIG. 4A is a schematic plan view showing a multimode interferometer for an optical semiconductor device.
Figure 4B:
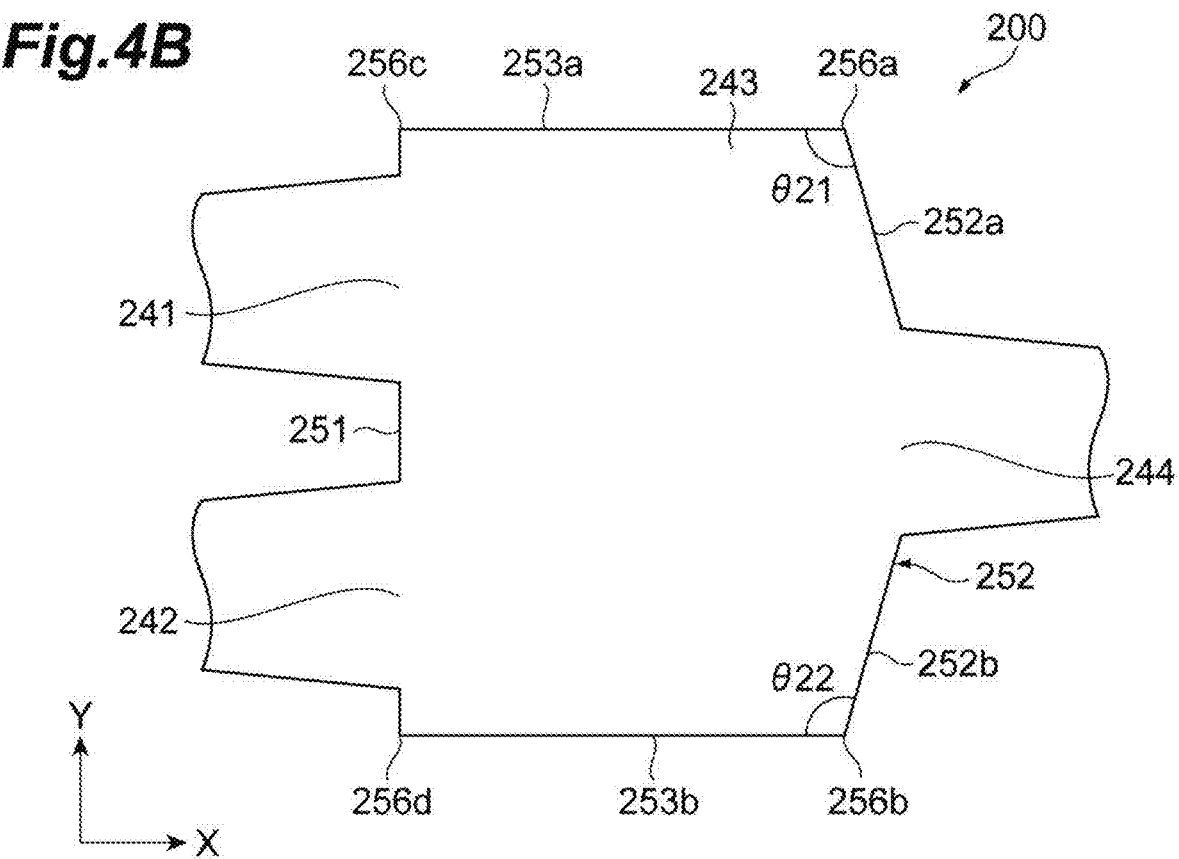
FIG. 4B is a schematic plan view showing a multimode interferometer for an optical semiconductor device.

FIGS. 4A and 4B are views each showing a multimode interferometer with a structure different from structures of the first and second multimode interferometers 2 and 3. In FIGS. 4A and 4B, an XY coordinate system is drawn.

The multimode interferometer 100 includes a multimode waveguide mesa 143 having first and second sides 153a and 153b substantially parallel to each other, and first and second end faces 151 and 152 substantially parallel to each other under manufacturing variations. Two waveguide mesas are connected to ports 141 and 142 (e.g., input ports) on the first end face 151, and a single waveguide mesa is connected to the port 144 (e.g., an output port) on the second end face 152. The angle (θ11) at the outer vertex 156a associated with the first side face 153a and the second end face 152 is 90 degrees under manufacturing variations. The angle (θ12) at the outer vertex 156b associated with the second side face 153b and the second end face 152 is 90 degrees under manufacturing variations. The angle at the outer vertex 156c associated with the first side face 153a and the first end face 151 is also 90 degrees under manufacturing variations. The angle at the outer vertex 156d associated with the second side face 153b and the first end face 151 is also 90 degrees under manufacturing variations.

The multimode interferometer 200 includes a multimode waveguide mesa 243, which includes a first and second side faces 253a and 253b parallel to each other, and first and second end faces 251 and 252. The first and second portions 252a and 252b of the second end face 252 are inclined with the first end face 251 such that the distance between the first and second portions 252a and 252b of the second end face 252 decreases in the direction from the first end face 251 to the second end face 252. Two waveguide mesas are connected to ports 241 and 242 (e.g., input ports) on the first end face 251, and a single waveguide mesa is connected to the port 244 (e.g., an output port) on the second end face 252. The angle (θ21) at the outer vertex 256a associated with the first side face 253a and the second end face 252 is an obtuse angle, for example, 112 degrees. The angle (θ22) at the outer vertex 256b associated with the second side face 253b and the second end face 252 is an obtuse angle, for example, 112 degrees. Further, the angle at the outer vertex 256c associated with the first side face 253a and the first end face 251 is 90 degrees under manufacturing variations. The angle at the outer vertex 256d associated with the second side face 253b and the first end face 251 is also 90 degrees under manufacturing variations.

The multimode interferometers 100, 200 and 3 each receive light beams of opposite phases at the two ports thereof.

Figure 5A:
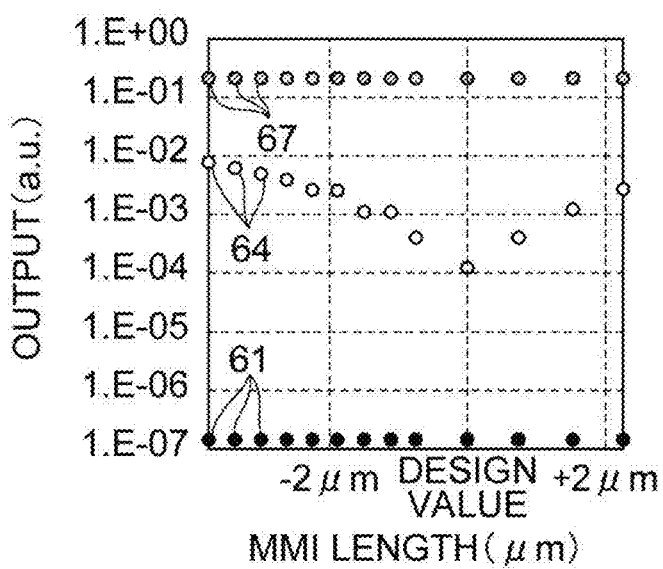
FIG. 5A is a graph showing the simulation result of characteristics of multimode interferometers.
Figure 5B:
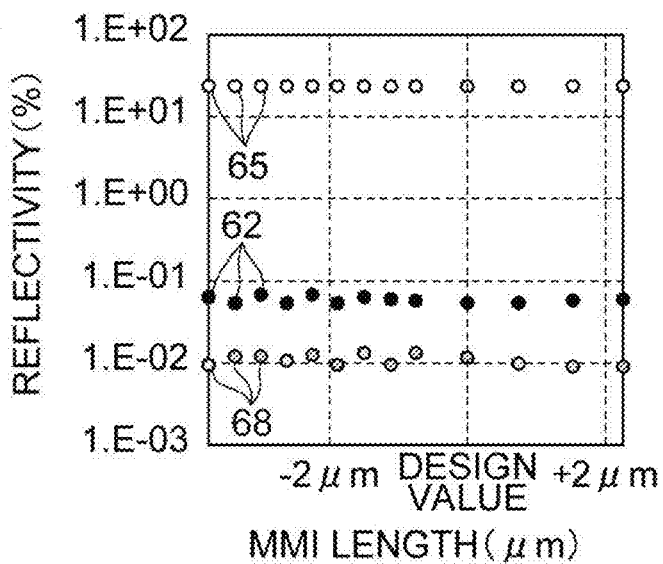
FIG. 5B is a graph showing the simulation result of characteristics of multimode interferometers.
Figure 5C:
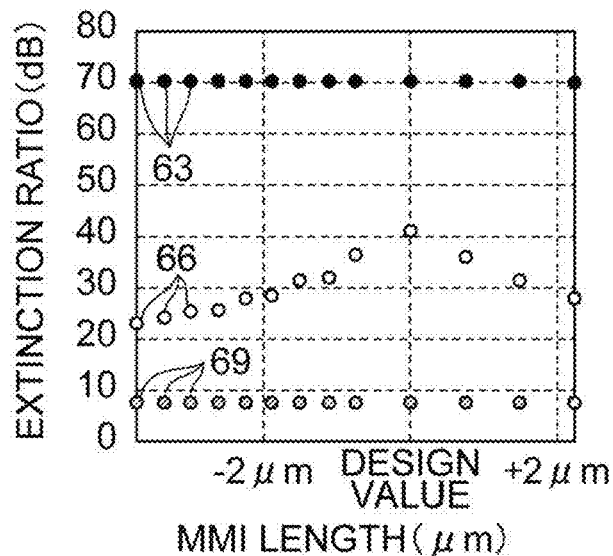
FIG. 5C is a graph showing the simulation result of characteristics of multimode interferometers.

FIGS. 5A, 5B and 5C each show the relationship between the waveguide length (referred to as the "MMI length") of the multimode waveguide mesa and the characteristics of the multimode interferometers. The characteristics of the multimode interferometers are calculated with a simulation model by an eigen mode expansion (EME) method. The distance between the output port and the end face having the two input ports is referred to as the MMI length. The horizontal axes in FIGS. 5A, 5B, and 5C indicate the waveguide length. The vertical axis of FIG. 5A indicates the output amount in the OFF-STATE, and the output amount is the ratio (LOUT/LIN) of the optical power (LIN) of the multimode interferometer to the optical power (LOUT) of the multimode interferometer. The vertical axis of FIG. 5B shows the reflectivity (return ratio) in the OFF-STATE and the reflectance is represented by $(I2/I1)^{0.5}$, where "I1" indicates an optical power that is input from the incident port to the multimode waveguide mesa, and "I2" represents the optical power fed back to the incident port. The vertical axis of FIG. 5C indicates the extinction ratio. FIGS. 5A and 5C show simulation results of the second multimode interferometer 3 by symbols 61 to 63, simulation results of the multimode interferometer 100 by symbols 64 to 66, and simulation results of the multimode interferometer 200 by symbols 67 to 69.

As shown in FIG. 5A, the second multimode interferometers 3 and 200 exhibit substantially constant output amounts (61 and 67) over a horizontal axis range (the length of the multimode waveguide). The multimode interferometer 100 exhibits the minimum in the output amount (64) around design lengths of the multimode waveguides. The second multimode interferometer 3 exhibits the output amount (61), which is as small as about 4 to 7 orders of magnitude as compared with the output amounts (64 and 67) of the multimode interferometers 100 and 200.

As shown in FIG. 5B, the second multimode interferometer 3 exhibits the reflectance (62) smaller than the reflectance (65) of the multimode interferometer 100 by several orders of magnitude, and smaller than the reflectivity (68) of the multimode interferometer 200 by about one order of magnitude.

As shown in FIG. 5C, the maximum extinction ratio of the second multimode interferometers 3, 100 and 200 are about 70 dB, about 42 dB, and about 7.6 dB, respectively.

Further, in the second multimode interferometers 3 and 200, the extinction ratios hardly vary in the range of values on the horizontal axis (the length of the multimode waveguide mesa). In the multimode interferometer 100, the extinction ratio varies depending on the MMI length. This variation of the multimode interferometer 100 is associated with that of the output quantity in the OFF-STATE. The second multimode interferometer 3 has the best value of the maximum extinction ratios among the multimode interferometers because, in the OFF-STATE, the second multimode interferometer 3 has an output amount extremely smaller than output amounts of the multimode interferometers 100 and 200. In the multimode waveguide mesa, the inclination of the entire end face adjoining the output port (the inclination of the first and second portions 52a and 52b in the present embodiment) allows the extinction ratio to be less dependent upon variations in the MMI length. This less dependence is due to the fact that the inclination of the entire end face can radiate or reflect the light incident on the multimode waveguide mesa from the entrance port outwardly of the multimode waveguide mesa. The multimode waveguide mesa having the exit port on the inclined end face exhibits a small dependence of the extinction ratio on changes in the MMI length.

The maximum extinction ratio of the multimode interferometer 200 is smaller than the maximum extinction ratios of the second multimode interferometers 3 and 100. The above simulation results can be understood on the ground of the following reasons: the multimode interferometer 200 has a first portion 252a and a second portion 252b, the width of which narrows toward the exit port located at the center of the multimode waveguide mesa 243, and the first and second portions 252a and 252b can reflect propagating light inward. This reflected light travels backward to the port 244 (the exit port), and a part of the backward light may enter the port 244.

FIGS. 6A, 6B and 6C show the relationship between the waveguide width (referred to as the "MMI width") of the multimode waveguide mesa and the characteristics of the multimode interferometers. The characteristics of the multimode interferometer are calculated with simulation models by the eigen mode expansion (EME) method. The MMI width is defined as the distance between the first and second side faces extending in the direction of the waveguide axis in which the multimode waveguide mesa extends. The horizontal axes in FIGS. 6A, 6B and 6C indicate the MMI width. The vertical axis of FIG. 6A indicates the output amount in the OFF-STATE, the vertical axis of FIG. 6B indicates the reflectance in the OFF-STATE, and the vertical axis of FIG. 6C indicates the extinction ratio. FIGS. 6A, 6B and 6C show simulation results of the second multimode interferometer 3 by symbols 71 to 73. FIGS. 6A, 6B and 6C show simulation results of the multimode interferometer 100 by symbols 74 to 76.

As shown in FIG. 6A, the output amount of the second multimode interferometer 3 is substantially constant over the horizontal axis range. The multimode interferometer 100 has the smallest output amount at the design value of the MMI width on the horizontal axis. Further, the second multimode interferometer 3 has an output amount smaller than that of the multimode interferometer 100 by about four orders of magnitude.

As shown in FIG. 6B, the reflectance of the second multimode interferometer 3 is smaller than that of the multimode interferometer 200 by several orders of magnitude.

As shown in FIG. 6C, the maximum extinction ratio of the second multimode interferometer 3 is about 70 dB. The maximum extinction ratio of the multimode interferometer 100 is about 40 dB. The second multimode interferometer 3 hardly depends on changes in the MMI width. But, the extinction ratio of the multimode interferometer 100 depends on the MMI width over the horizontal axis. These results indicate that the multimode waveguide mesa, which includes the inclined face (the first and second portions of the end face) on the entire end face adjoining the output port, has a high maximum extinction ratio and that the extinction ratio of the multimode waveguide mesa does not depend much on variations in the MMI width.

Figure 7A:
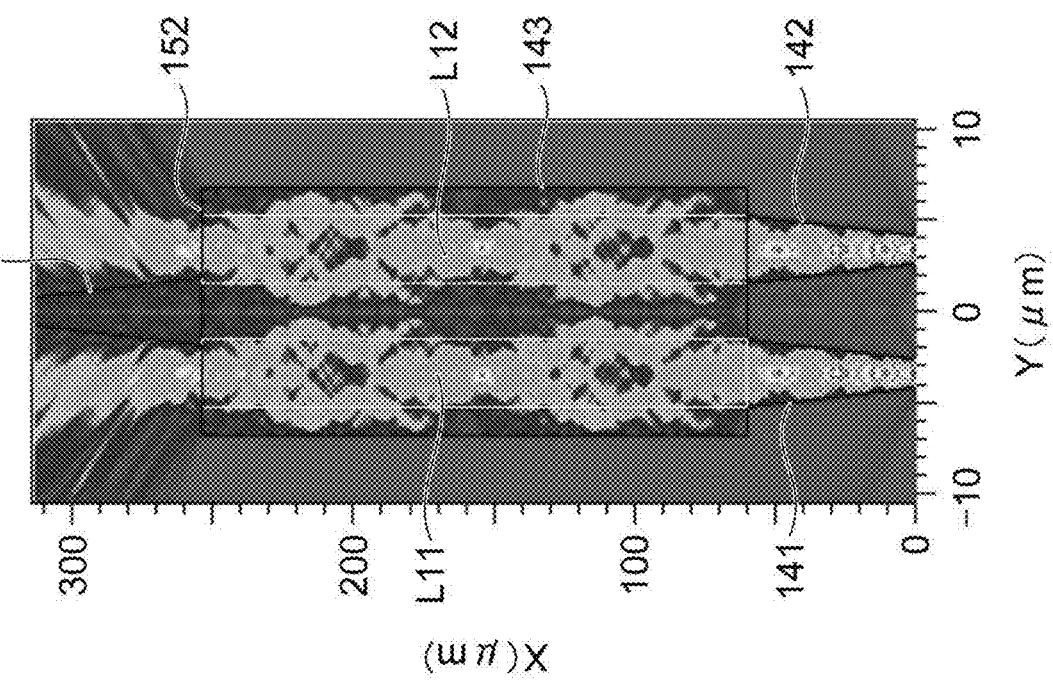
FIG. 7A is a view showing the simulation result of intensity distribution of light propagating through in a multimode waveguide mesa.
Figure 7B:
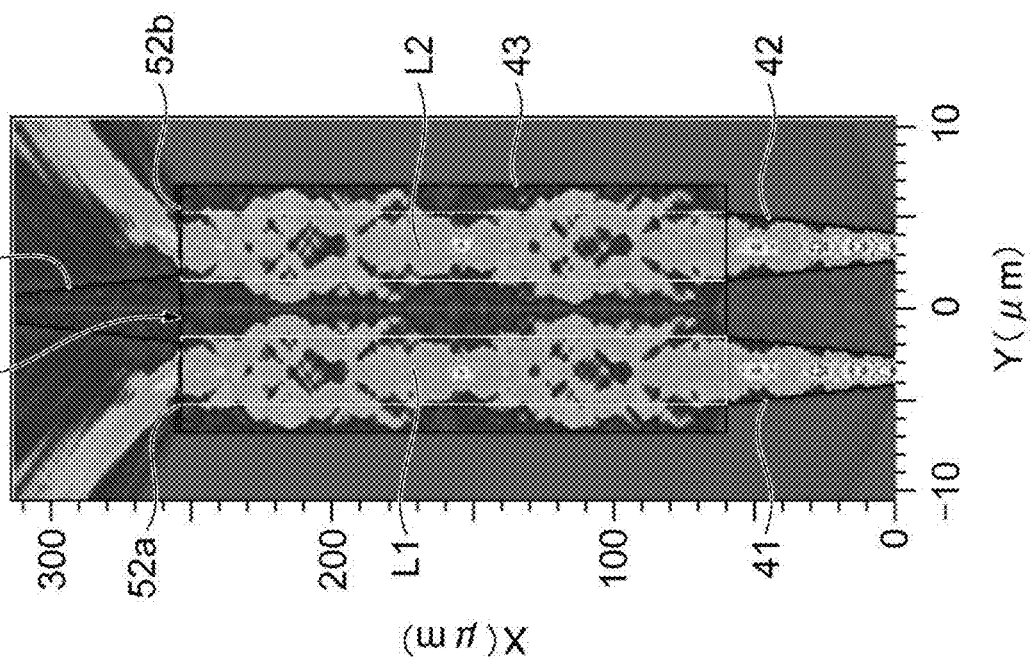
FIG. 7B is a view showing the simulation result of intensity distribution of light propagating through in a multimode waveguide mesa.

FIG. 7A is a view showing a distribution in optical intensity in a multimode waveguide mesa for the second multimode interferometer according to the present embodiment, and FIG. 7B is a view showing a distribution in optical intensity in a multimode waveguide mesa for the multimode interferometer 100. The simulation results shown in FIGS. 7A and 7B are calculated by the beam propagation (BPM) method. Calculation with the BPM method cannot take light reflected in the MMI optical waveguide into consideration. Further, each simulation assumes that light incident on the MMI optical waveguide is simply radiated outward at the end face, which is connected to the output port of the multimode waveguide mesa, without entering the output port. In FIGS. 7A and 7B, the X axis is oriented in a direction from the second end face 51 of the multimode waveguide mesa 43 to the first end face 52. The Y axis is located on the port 44 (the output port) of the multimode waveguide mesa 43.

As shown in FIG. 7A, most of the light components L1 and L2 coining from the first and second ports 41 and 42 are refracted at inclined faces (the first end face 52 including the first portion 52a and the second portion 52b) adjoining the port 44 on both sides (the emission port). These figures show that the amount of the return light reflected by the first end face 52 is very small.

As shown in FIG. 7B, the light components L11 and L12 coining from the ports 141 and 142 are reflected to the multimode waveguide mesa 143 without being refracted at the second end face 152 adjoining the port 144 on both sides (the output port).

Figure 8:
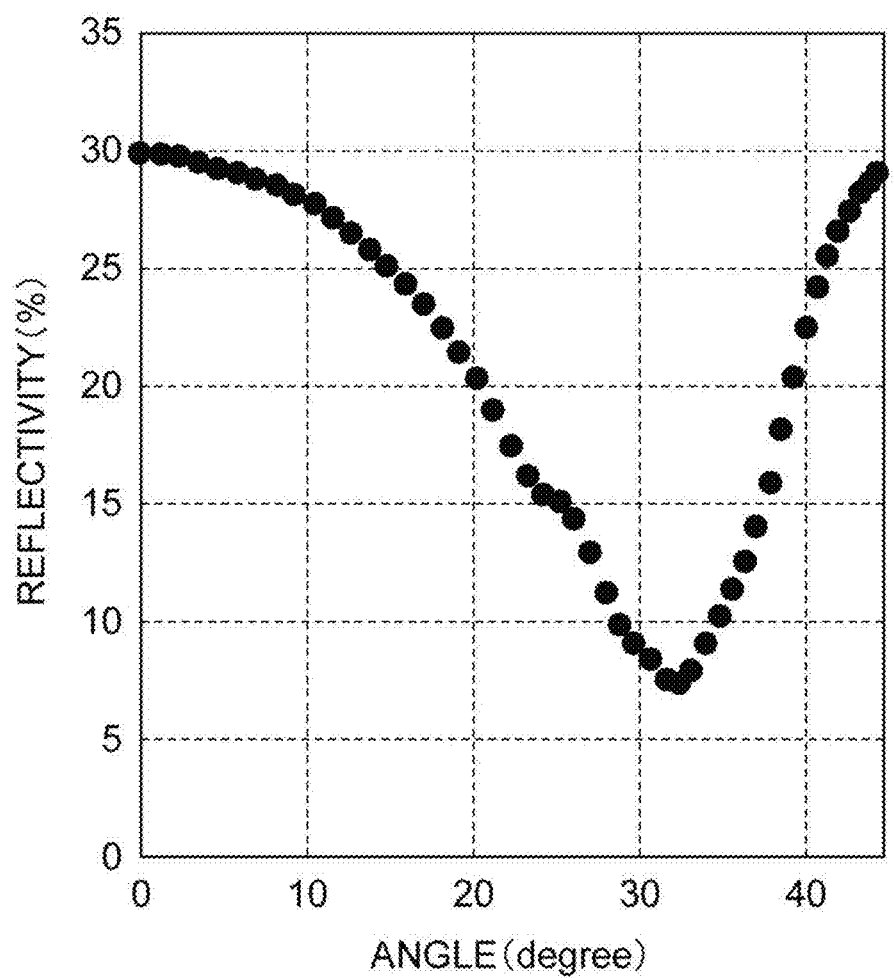
FIG. 8 is a graph showing a relationship between an angle at the inner vertex of the multimode waveguide mesa and a reflection ratio at the first end face thereof according to the embodiment.
Figure 9:
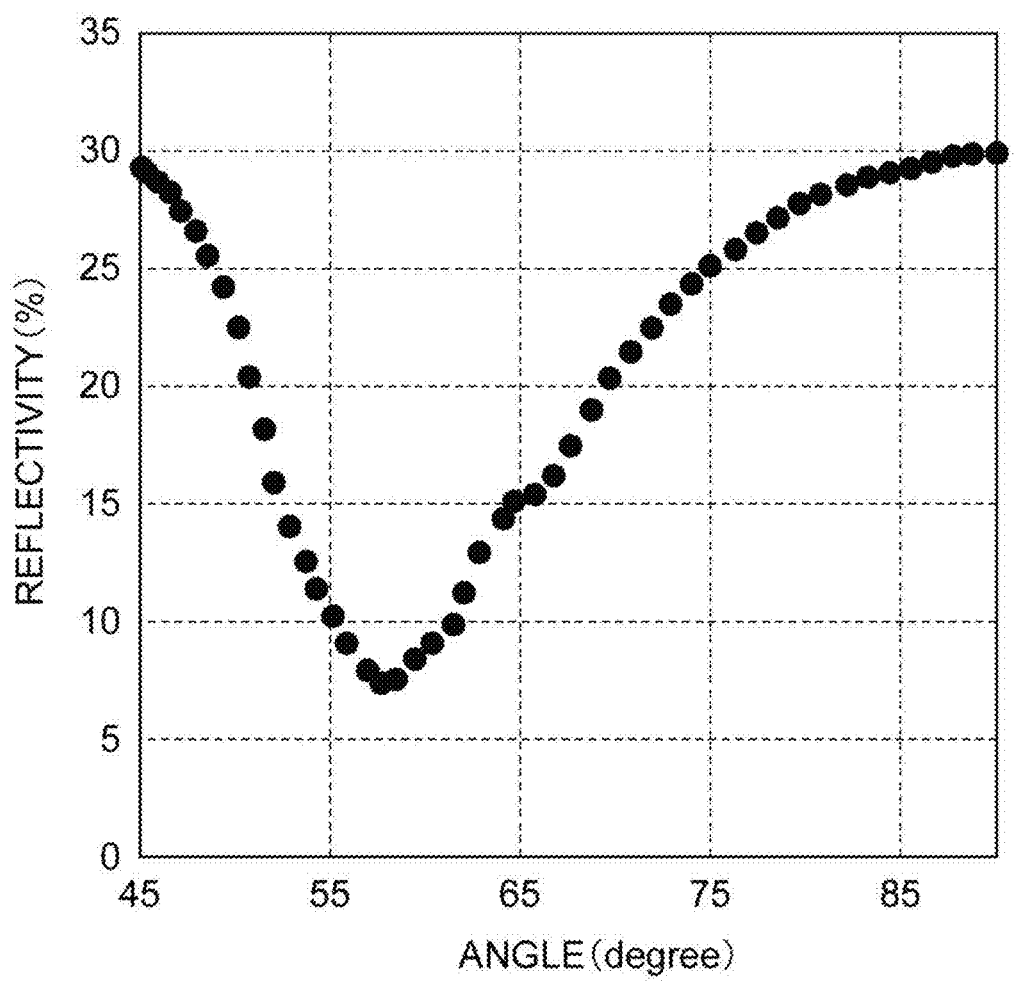
FIG. 9 is a graph showing a relationship between an angle at the outer vertex of the multimode waveguide mesa and a reflection ratio at the first end face thereof according to the embodiment.

FIGS. 8 and 9 are views showing the relationship between the inclination angle of the second end face in the multimode waveguide mesa and the reflectance of the multimode interferometer according to the present embodiment. Specifically, FIG. 8 shows the dependence of the reflectance on the inclination angle of the second end face ($\theta 3$, $\theta 4$, $\theta 7$, and $\theta 8$). In FIG. 8, the horizontal axis represents the angle $\theta 7$ in the second multimode interferometer 3, and the vertical axis represents the reflectance. FIG. 9 shows the dependence of reflectance on the inclination angles of the second end face ($\theta 1$, $\theta 2$, $\theta 5$, and $\theta 6$). In FIG. 9, the horizontal axis represents the angle $\theta 5$ in the second multimode interferometer 3, and the vertical axis represents the reflectance. The results in FIGS. 8 and 9 are calculated by the Finite-Difference Time-Domain (FDTD) method.

Referring to FIG. 8, the reflectance is the lowest at an angle $\theta 7$ of approximately 30 degrees. A reflectance of 25% or less is obtained in a range of, for example, 15 degrees or more and 42 degrees or less in the angle $\theta 7$. As seen from the result shown in FIG. 8, the inclination of the second end face improves the extinction ratio. Also, the extinction ratio has excellent values in the above angle range.

Referring to FIG. 9, the reflectance is the lowest at an angle $\theta 5$ of about 60 degrees. A reflectance of 25% or less is obtained in an angle range of, for example, 48 degrees or more and 75 degrees or less in the angle $\theta 7$. As seen from the results shown in FIG. 9, the inclination of the second end face improves the extinction ratio. The extinction ratio has excellent values in the above angle range.

The present embodiments allow the multimode interferometer to improve the extinction ratio thereof, and can provide a Mach-Zehnder modulator with the multimode interferometer.

Having described and illustrated the principle of the invention in a preferred embodiment thereof, it is appreciated by those having skill in the art that the invention can be modified in arrangement and detail without departing from such principles. We therefore claim all modifications and variations coining within the spirit and scope of the following claims.

What is claimed is:

1. A Mach-Zehnder modulator comprising:
a first arm waveguide mesa;
a second arm waveguide mesa;
a waveguide mesa; and
a 2×1 multimode interferometer as a merger, the merger being optically coupled to the first arm waveguide mesa, the second arm waveguide mesa, and the waveguide mesa,
the merger including a multimode waveguide mesa,
the multimode waveguide mesa having a top face extending along an axis, a first side face and a second side face that extend along the axis, and a first end face and a second end face,
the multimode waveguide mesa being connected to the waveguide mesa at a port on the first end face,
the multimode waveguide mesa being connected to the first arm waveguide mesa at a first port on the second end face,
the multimode waveguide mesa being connected to the second arm waveguide mesa at a second port on the second end face,
the multimode waveguide mesa having a first side edge line shared by the first side face and the top face of the multimode waveguide mesa, and a front edge line shared by the first end face and the top face of the multimode waveguide mesa, the first side edge line and the front edge line meeting at an outer vertex,
the multimode waveguide mesa having a rear edge line shared by the second end face and the top face of the multimode waveguide mesa, the rear edge line having a first portion, a second portion, and a third portion, the first portion extending from the first side face to the first arm waveguide mesa, the second portion extending from the first arm waveguide mesa to the second arm waveguide mesa, and the third portion extending from the second arm waveguide mesa to the second side face, the first, the second, and the third portions of the rear edge line being aligned in a line,
wherein the first side edge line forms a first acute angle with the front edge line at the outer vertex,
the waveguide mesa including a top face, a first side face and a second side face,
the waveguide mesa having a first side edge line shared by the top face thereof and the first side face thereof, and a second side edge line shared, by the top face thereof and the second side face thereof,
the front edge line of the multimode waveguide mesa and the first side edge line of the waveguide mesa meeting at a first inner vertex, and
the front edge line of the multimode waveguide mesa and the second side edge line of the waveguide mesa meeting at a second inner vertex,
wherein the front edge line of the multimode waveguide mesa forms a second acute angle with a line passing through the first inner vertex and the second inner vertex, the second acute angle being equal to the Brewster angle defined by refractive indices of the multimode waveguide mesa and an outside cladding medium.

2. The Mach-Zehnder modulator according to claim 1, wherein
the front edge line of the multimode waveguide mesa extends along a first reference line,
the first, the second, and the third portions of the rear edge line of the multimode waveguide mesa extend along a second reference line, and the first reference line and the second reference line form substantially the same angle as the second acute angle.

3. The Mach-Zehnder modulator according to claim 1, wherein a sum of the first and second acute angles is less than a right angle.

4. The Mach-Zehnder modulator according to claim 1, wherein a sum of the first and second acute angles is equal to a right angle.

5. The Mach-Zehnder modulator according to claim 1, further comprising:
 a first inorganic layer in contact with the top face, the first side face and the second side face of the multimode waveguide mesa,
 a benzocyclobutene resin body covering the top face of the multimode waveguide mesa, and
 a second inorganic layer in contact with a top face of the benzocyclobutene resin body.

6. A Mach-Zehnder modulator comprising:
 a first arm waveguide mesa;
 a second arm waveguide mesa;
 a waveguide mesa; and
 a 1×2 multimode interferometer as a divider, the divider being optically coupled to the first arm waveguide mesa, the second arm waveguide mesa, and the waveguide mesa, the divider including a multimode waveguide mesa,
 the multimode waveguide mesa having a top face extending along an axis, a first side face and a second side face that extend along the axis, and a first end face and a second end face, the multimode waveguide mesa being connected to the waveguide mesa at a port on the first end face,
 the multimode waveguide mesa being connected to the first arm waveguide mesa at a first port on the second end face,
 the multimode waveguide mesa being connected to the second arm waveguide mesa at a second port on the second end face,
 the multimode waveguide mesa having a first side edge line shared by the top face and the first side face of the multimode waveguide mesa, and a rear edge line shared by the top face and the first end face of the multimode waveguide mesa, the first side edge line and the rear edge line meeting at an outer vertex,
 the multimode waveguide mesa having a front edge line shared by the second end face and the top face of the multimode waveguide mesa, the front edge line having a first portion, a second portion, and a third portion, the first portion extending from the first side face to the first arm waveguide mesa, the second portion extending from the first arm waveguide mesa to the second arm waveguide mesa, and the third portion extending from the second arm waveguide mesa to the second side face, the first, the second, and the third portions of the front edge line being aligned in a line,
 wherein the first side edge line forms a first acute angle with the rear edge line at the outer vertex,
 the waveguide mesa including a top face, a first side face and a second side face, the waveguide mesa having a first side edge line shared by the top face thereof and the first side face thereof, and a second side edge line shared by the top face thereof and the second, side face thereof,
 the rear edge line of the multimode waveguide mesa and the first side edge line of the waveguide mesa meeting at a first inner vertex, and the rear edge line of the multimode waveguide mesa and the second side edge line of the waveguide-mesa meeting at a second inner vertex,
 wherein the rear edge line of the multimode waveguide mesa forms a second acute angle with a line passing through the first inner vertex and the second inner vertex, the second acute angle being equal to the Brewster angle defined by refractive indices of the multimode waveguide mesa and an outside cladding medium.

7. The Mach-Zehnder modulator according to claim 6, wherein
 the rear edge line extends along a first reference line,
 the first, the second, and the third portions of the front edge line extend along a second reference line, and
 the first reference line and the second reference line form substantially the same angle as the second acute angle.

8. The Mach-Zehnder modulator according to claim 6, wherein a sum of the first and second acute angles is less than a right angle.

9. The Mach-Zehnder modulator according to claim 6, wherein a sum of the first and second acute angles is equal to a right angle.

10. The Mach-Zehnder modulator according to claim 6, further comprising:
 a first inorganic layer in contact with the top face, the first side face and the second side face of the multimode waveguide mesa,
 a benzocyclobutene resin body covering the top face of the multimode waveguide mesa, and
 a second inorganic layer in contact with a top face of the benzocyclobutene resin body.

11. A multimode interferometer comprising:
 a multimode waveguide mesa having a top face extending along an axis, a first side face and a second side face that extend along the axis, and a first end face and a second end face,
 a waveguide mesa connected to the first end face at a port of the multimode waveguide mesa;
 a first waveguide mesa connected to the second end face at a first port of the multimode waveguide mesa: and
 a second waveguide mesa connected to the second end face at a second port of the multimode waveguide mesa,
 the multimode waveguide mesa having a first side edge line shared by the top face thereof and the first side face thereof, and a first end line shared by the top face thereof and the first end face thereof, the first side edge line and the first end line meeting at an outer vertex,
 wherein the first side edge line forms a first acute angle with the first end line at the outer vertex,
 the waveguide mesa including a top face, a first side face and a second side face,
 the waveguide mesa having a first side edge line shared by the top face thereof and the first side face thereof, and a second side edge line shared by the top face thereof and the second side face thereof,
 the first end line of the multimode waveguide mesa and the first side edge line of the waveguide mesa meeting at a first inner vertex, and the first end line of the multimode waveguide mesa and the second side edge line of the waveguide mesa meeting at a second inner vertex,
 wherein the first end line of the multimode waveguide mesa forms a second acute angle with a line passing through the first inner vertex and the second inner vertex, the second acute angle being equal to the Brewster angle defined by refractive indices of the multimode waveguide mesa and an outside cladding medium.

12. The multimode interferometer according to claim 11, wherein the multimode waveguide mesa has a structure of one of a 2×1 multimode interferometer and a 1×2 multimode interferometer.

13. The multimode interferometer according to claim 11, wherein
the multimode waveguide mesa has a second end line shared by the second end face and the top face of the multimode waveguide mesa,
the second end line has a first portion, a second portion, and a third portion,
the first portion extends from the first side face to the first waveguide mesa,
the second portion extends from the first waveguide mesa to the second waveguide mesa,
the third portion extends from the second waveguide mesa to the second side face,
the first, the second, and the third portions of the second end line are aligned in a line to extend along a second reference line, and
the second reference line forms an acute angle with a first reference line along which the first end line extends.

* * * * *